United States Patent [19]
Eichler et al.

[11] 4,091,318
[45] May 23, 1978

[54] CHARGER/CONVERTER CONSOLE WITH REEL ARRANGEMENT

[75] Inventors: Jay Harris Eichler, Boca Raton; Bernard Gasparaitis, Ft. Lauderdale, both of Fla.

[73] Assignee: Motorola Inc., Schaumburg, Ill.

[21] Appl. No.: 769,084

[22] Filed: Feb. 16, 1977

[51] Int. Cl.² .................. B65H 75/48; H01B 1/38
[52] U.S. Cl. .................. 320/2; 191/12.2 R; 242/107; 325/16
[58] Field of Search .......... 242/107 R, 107.11, 107.1; 325/16, 496; 320/2; 191/12.2, 12.4

[56] References Cited
U.S. PATENT DOCUMENTS

| | | | |
|---|---|---|---|
| 2,518,072 | 8/1950 | Rushworth | 242/107.1 |
| 3,156,431 | 11/1964 | Zivi | 242/107 R |
| 3,386,682 | 6/1968 | Bajek | 242/107 R |

OTHER PUBLICATIONS

Federal Signal Corp. Adv., inside front cover page, communications, Oct. 1975.

*Primary Examiner*—Robert J. Hickey
*Attorney, Agent, or Firm*—Margaret Marsh Parker; James W. Gillman

[57] ABSTRACT

A console for charging a portable communications device and converting it for mobile operation can accommodate portable units of varying lengths. The contacts for the charging current are positioned by the insertion of a portable unit by means of a unique reel mechanism. Interconnection and latching are also activated by the insertion of the portable unit. The converter connector serves as a part of the latching and locking apparatus which makes the unattended portable essentially theft proof.

15 Claims, 6 Drawing Figures

U.S. Patent  May 23, 1978  Sheet 1 of 2  4,091,318
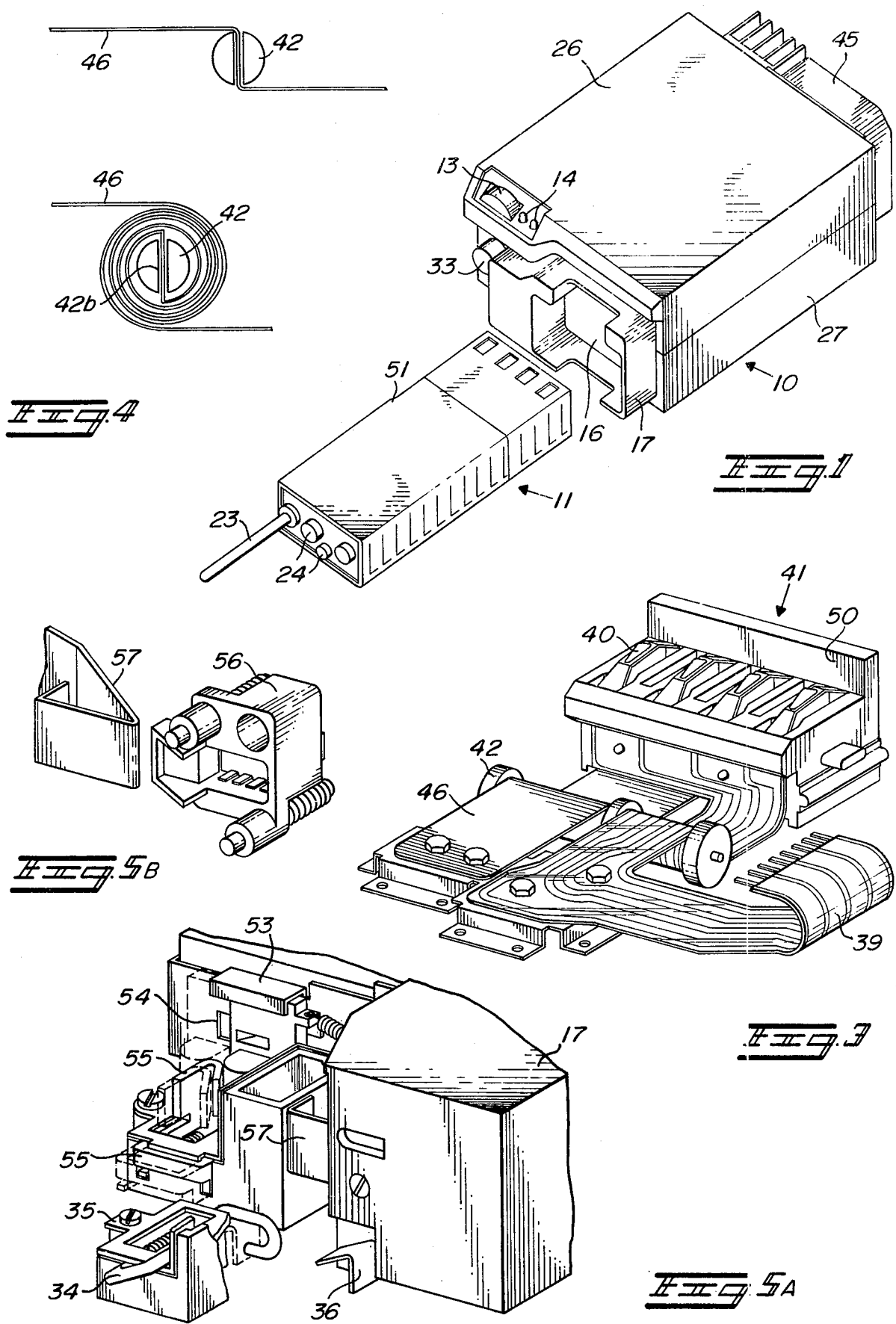

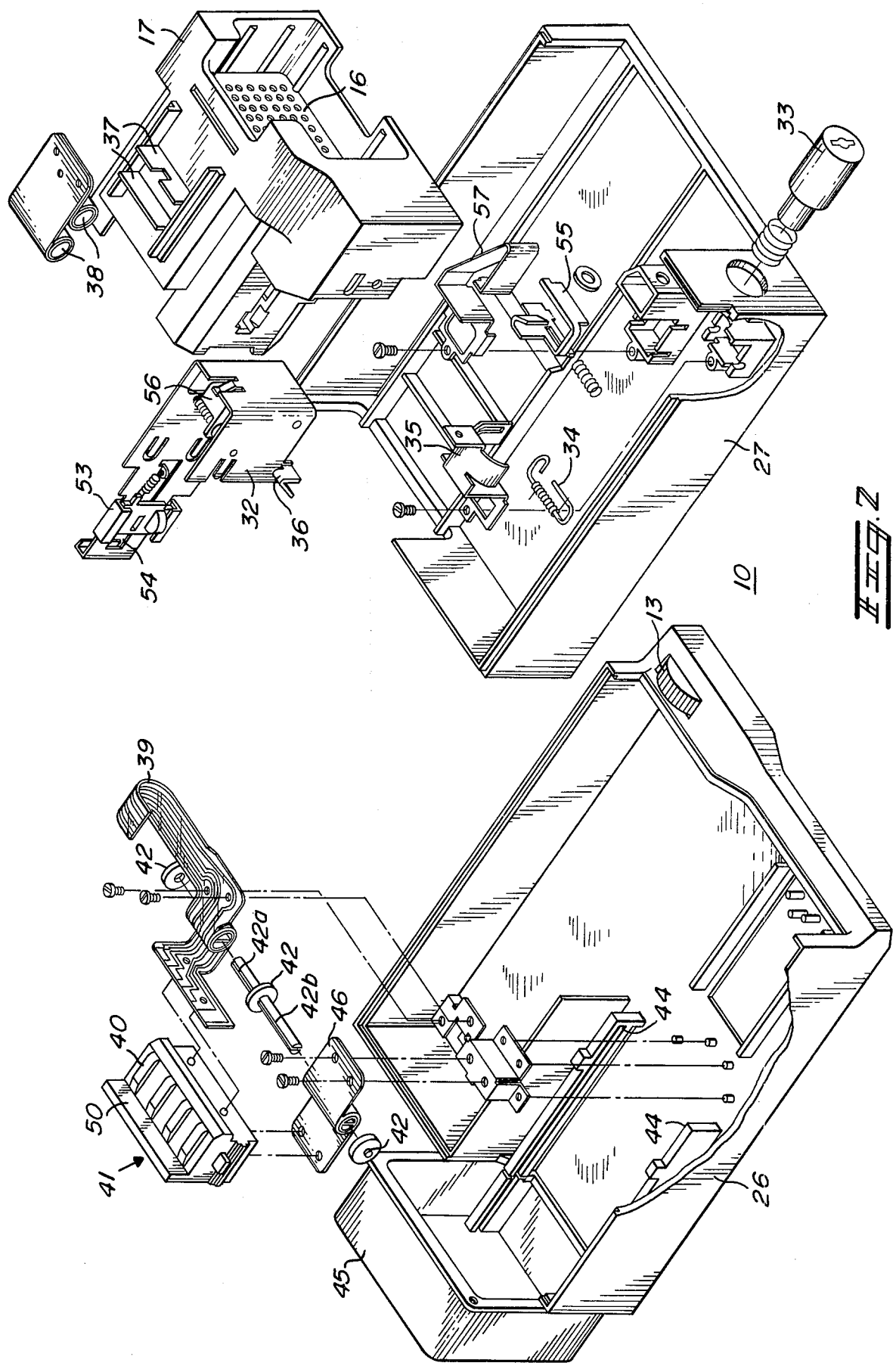

4,091,318

CHARGER/CONVERTER CONSOLE WITH REEL ARRANGEMENT

BACKGROUND OF THE INVENTION

This invention relates to the field of charging and conversion consoles for interconnecting with and retaining portable communication units therein for charging and mobile operation and more particularly to a reel mechanism for the accommodation of portable units having various lengths.

With the advent of portable communication units in addition to mobile communication units in such fields as public safety, it was desirable to be able to recharge the batteries of a portable unit when within the vehicle. Plug-in pockets were added to mobile units for this purpose. Since having two separate communications units in a vehicle involves much duplication of components, it was desirable to make a portable unit which was readily adaptable to mobile use. Units were built wherein the circuits of a portable unit were utilized as the core of a mobile unit when the portable unit was plugged into a console in the vehicle. However, portable units were subsequently built with varying lengths, e.g., to accommodate smaller or larger battery packs, and it was desirable to devise a common model of adapter for use with a range of portable unit sizes. Adapters were made which could accommodate more than one length of portable, but the major problem encountered was the connection of a charging circuit. Other desirable characteristics for such an adapter are theft and damage prevention for the portable while inserted in the console, plus ease of insertion and release.

SUMMARY OF THE INVENTION

It is, therefore, an object of the present invention to provide a charger/adapter console for use with portable communications devices of varying lengths.

It is a specific object to provide a reel mechanism for a flexible charging circuit within the console for accommodating units of differing lengths.

These objections are achieved by a console, in accordance with the invention, having a unique reel mechanism and insertion-actuated latching mechanisms for making the console able to accommodate various portable units.

Insertion of a portable unit into a sleeve in a vehicle mounted console causes the sleeve to move into the console, interconnections to be made to the operative circuit elements of the portable and console for mobile operation, and charging of the battery of the portable unit. A movable charging plate allows for accommodation of portable units of many different lengths. Electrical connections are made through the charging plate by means of a flexible circuit. A reel mechanism having a double spool winds and unwinds the flexible circuit, the spool being driven by a dual wound constant force spring. A latching mechanism which operates with units of differing lengths prevents accidental exposure of the interconnect contacts until a portable unit is inserted into the sleeve. The contact block then retains the portable unit in the sleeve and the sleeve is held within the console until a key lock is unlocked. Then the portable and sleeve are moved outward for easy removal of the portable unit. Singly wound constant force springs assist in the return of the sleeve and portable unit to the release position.

BRIEF DESCRIPTION OF THE DRAWING

FIG. 1 is an external view of a portable communications unit and charger/converter console according to the invention.

FIG. 2 is an exploded view of portions of the console unit of FIG. 1.

FIG. 3 is a perspective view of the charger circuit assembly.

FIG. 4 is a cut away view of the double wound spring of FIGS. 2 and 3 in normal and extended positions.

FIG. 5 is a perspective view of the latching, locking and connector assembly.

DETAILED DESCRIPTION OF A PREFERRED EMBODIMENT

The charging and adapter console 10 of the invention is designed to convert a portable communications unit 11 into a mobile unit, and to accommodate portable units of differing lengths. A preferred embodiment of the console and a mating portable unit are shown in FIG. 1 with the portable unit detached. The console shown could be installed under the dash of a vehicle, powered by the electrical system of the vehicle, would preferably be connected to an antenna on the vehicle and to a hand-held microphone, and could utilize an optional external speaker. The vehicle installation is not shown herein, as such installations are conventional and known to those skilled in the art.

The housing of the console 10 is preferably molded in two mating halves (see FIG. 2), made of a resilient high impact plastic. The housing would include such controls, indicators and displays as are desired. These could include a volume control 13 for use with the optional speaker (not shown) mode indicator lights 14, etc. A hinged door 16 is shown covering the opening to a movable sleeve 17 into which any mating portable unit can be inserted. A hand-held microphone (not shown) may be connected to the console 10.

The portable unit 11 has its antenna 23 and various controls and indicators 24 on the end which is the top in normal hand-held position. The microphone and speaker of the portable unit are normally sound-accessed through grille apertures on the side which is down in FIG. 1. The bottom side of the console housing 12 likewise has grille apertures (not shown) for sound access to the speaker in the portable unit when an external speaker is not used.

In the exploded view of FIG. 2 the interior of the console 10 and the elements necessary to the invention are shown. The top half 26 of the console has been inverted and positioned adjacent the bottom half 27. The movable sleeve 17 is shown in the upper right corner with the major components necessary for latching, locking and interconnecting. These include a generally U-shaped bracket 32 which moves with the sleeve 17 and which supports an interconnect assembly and a latching assembly. These two assemblies will be described in some detail with respect to FIG. 4. Also shown is a key lock 33, a wire latch 34 released by the lock, a metal bracket 35 for retaining the lock and the wire latch, and a camming surface 36 on the bracket 32. On the upper surface of the sleeve 17 may be seen two vertical structural members 37 each of which engages one of the single wound constant force springs 38 which are attached at one end to the top housing half 26. The springs 38 are extended as the sleeve 17 moves into the console 10 at the insertion of a portable unit and assist in the return of the sleeve and portable unit to the projecting position when the sleeve is released.

With the housing half 26 in FIG. 2 is shown a flexible circuit 39 which carries charging current to terminals 40 on an insulating charging plate 41 which are contacted by charge terminals (not shown) on the portable unit 11 when the unit is inserted into the sleeve 17. Charging current is provided by circuitry (not shown) within the console. Such circuitry is powered by the power supply of the vehicle and is well known in the art. The flexible circuit 39 is wound on one half of a rotatable double spool 42 (shown in three parts) which can also slide in a pair of tracks 44 in the housing half. The charging plate 41 is also movable on the tracks 44. When an extender 45 is needed on the rear of the console 10 in order to accommodate long portable units, the tracks 44 will extend into the extender unit. The second side of the spool 42 has a double wound, constant force spring 46 wound thereon. These components form a reel mechanism which will be better understood in relation to FIG. 3.

Referring now to FIG. 3, a middle portion of the flexible circuit 39 passes through a slot 42a in one end of the shaft of the double spool 42, has one end attached to the charging plate 41 and the other end mechanically attached to the housing half 27 and electrically connected to the source of the charging current. As the portable unit 11 is inserted into the console 10, and the portable unit terminals contact the charging terminals 40 on the charging plate 41, a projecting portion 50 of the plate is engaged by a back edge of the portable unit 11 and moved rearward. As the plate 41 moves frontward and rearward, the flexible circuit is wound and unwound instead of being able to move freely within the console 10. Although flexible circuits are capable of withstanding bending over a reasonable radius, the metallic leads can be damaged by sharp bending, as for example by being pinched. It is, therefore, not desirable to have several inches of flexible circuit loose in the vicinity of moving components where damage could be sustained.

The double spool 42 has a second slot 42b through which is passed a middle portion of the double wound spring 46. This is a constant force spring, formed of a pre-stressed strip of flat spring stock which will coil up on itself when free. A singly wound spring of this type is commercially available as a Neg'ator spring. When such a spring is deflected by straightening out its outer end, a resisting force develops which acts through the center of the coil. This force does not increase with deflection as is the case with other types of springs. The deflection energy is stored in the material of the straightened portion. In order to rewind the flexible circuit and allow it to unwind, a double wound spring is used, i.e., a strip of spring stock with a small, unstressed middle portion and the end portions stressed in opposite senses, so that when the middle portion is inserted in the slot in the spool 42 the end portions wrap themselves around the spool in the same direction. When one end is fixedly attached to the housing half 27, and the other end attached to the movable plate 41, the spool 42 will rotate and move rearward as the plate moves rearward but only approximately half as far. The flexible circuit 39 on the other part of the spool 42 will likewise be wound and unwound as the plate 41 moves and will not be exposed to possible damage. It is to be noted that the double wound spring 46 and the single wound spring 38 may be laminated for increased rewind force.

FIG. 4 shows the double wound constant force spring 46 in the extended and normal positions in a cut away side view.

FIG. 5 shows the related mechanism for preventing the unauthorized removal of the portable unit and for allowing the insertion for charging and interconnection. Operatively, before the portable unit 11 enters the sleeve 17 the sleeve is in the extended position of FIG. 1 and the door 16 is closed. As the portable unit enters, the door 16 opens, then the shoulder portion 51 of the portable unit engages the latch portion of a plastic cam/latch 53. As the cam/latch is moved a short distance along a slot 54 in the bracket 32, the cam portion of cam/latch 53 moves a locking bracket 55 away from the sleeve 17, pulling the ends of the bracket 55 out of the sleeve interior allowing the portable unit 11 and sleeve 17 to move rearward together as the unit 11 engages projections (not shown) on the interior of the sleeve adjacent the rear end of the slot 54. The cam/latch 53 and the bracket 55 are spring biased to return to the initial positions when released. As the sleeve 17 moves rearward, a cam follower which is integral with a connector plug 56 is driven on a camming surface 57 mounted on the console half 27. Thus, as the sleeve 17 and the portable unit 11 move rearward within the console 10, the connector plug 56 makes electrical contact with the portable unit. In this preferred model of charger/converter, the contacts would disconnect the internal microphone of the portable unit 11 and connect the audio input to a hand-held microphone. The antenna 23 would be disconnected and the vehicle antenna (not shown) would be connected to the RF input of the portable unit 11. As an option, the internal speaker would be disconnected and a vehicle-mounted speaker connected to the audio output. These specific connections are, of course, only exemplary. Since the portable 11 and the connector plug 56 are moving rearward together, the plug can be inserted without damage to either part. The connector plug is spring biased to return to the initial position when the sleeve is released. The small camming surface 36 is integral with the U-shaped bracket 32 and as the bracket moves with the sleeve 17, one end of the wire latch 34 is forced to ride up on the camming surface 36 and drop behind for latching the U-shaped bracket 32, sleeve 17 and portable unit 11 in the rearward or charging position. The wire latch 34 can only be released by unlocking and depressing the key lock 33. Since the key (not shown) for the key lock can be removed and both sleeve 17 and inserted portable 11 are completely within the console 10 during charging and mobile operation with the connector plug 56 inserted in the portable, the portable unit is essentially theft proof.

Thus, there has been shown and described a reel mechanism for winding and unwinding a flexible strip such as a flexible circuit in a charger/converter console for use with a variety of lengths of portable communications devices. The charging connections are movable to connect with the terminals of all the portable devices without danger to the circuitry. The entry of a portable into the device causes both the interconnection of the two and the locking of the portable unit within the console.

What is claimed is:

1. A charging and converter console for use with insertable communications unit of differing lengths and comprising:

housing means for receiving the communications units;

a source of charging current;

insulating means movably supported within the housing means;

contact means fixedly mounted on the insulating means;

spool means mounted within the housing means for rotational motion and for motion along the line of insertion of the communications units;

flexible circuit means double wound on a first half of the spool means and connected to couple the charging current source to the contact means; and constant force spring means double wound on a second half of the spool means and attached to the housing means and to the insulating means, for winding up the flexible circuit means, and for biasing the insulating means to an initial position.

2. The console according to claim 1 wherein the spool means has two slots spaced apart along the axis thereof for retaining middle portions of the flexible circuit means and the spring means.

3. The console according to claim 1 wherein the constant force spring means is formed of a plurality of metal strips, each having a middle portion and two end portions, the middle portion being unstressed and, one of the end portions being prestressed in a sense opposite to that of the other end portion, the end portions tending to wind around the spool means in the same direction.

4. The console according to claim 1 wherein a portion of the insulating means is adapted to be engaged by a portion of an inserted communications unit for motion with the insertion of said unit and for assisting in the ejection of said unit.

5. The console according to claim 1 and further including sleeve means for receiving a communications unit and slideably mounted within the housing means.

6. The console according to claim 5 and further including locking means mounted on the housing means and wherein the sleeve means further includes means for cooperating with the locking means for releasably retaining the sleeve means within the housing means.

7. The console according to claim 5 wherein the sleeve means includes bracket means and connector means slideably mounted on the bracket means for making electrical connections with an inserted unit.

8. The console according to claim 7 wherein the console is mounted within a vehicle and further including electrical components coupled to the console and at least one of the electrical components of the inserted communications unit is disconnected and at least one of the electrical components coupled to the console is coupled to the inserted unit.

9. The console according to claim 5 and further including sleeve latching means, said latching means being releasable upon insertion of a unit.

10. The console according to claim 5 and further including single wound, constant force spring means having one end fixedly attached to an inner wall of the housing means, and wherein the sleeve means is adapted to cooperate with the single wound spring means for biasing the sleeve means to an initial position.

11. The console according to claim 8 wherein one of the components coupled to the console is an antenna.

12. The console according to claim 5 wherein the connector means is adapted to releasably retain the communication unit within the sleeve means.

13. A reel mechanism for winding and unwinding an elongated strip of flexible material and comprising:

a mounting surface;

a supporting structure, slideably mounted on the mounting surface for motion along a predetermined line;

spool means, rotatably and slideably mounted on the mounting surface for motion along the predetermined line and having two elongated slots through and parallel to the axis thereof, said slots being spaced apart along said axis, one of said slots receiving a middle portion of the flexible strip; and double wound constant force spring means having an unstressed middle portion received in the other of said slots in the spool means, and having prestressed end portions, one end portion being stressed in a sense opposite to that of the other end portion, the end portions tending to wind around the spool means in the same direction;

one end of the flexible strip and one end of the spring means being fixedly attached to a predetermined position on the mounting surface, and the other end of the flexible strip and the other end of the spring means being fixedly attached to the supporting structure for extending the flexible strip and the spring means by movement of the supporting structure away from the predetermined position, the spring means providing motive force for winding the flexible strip onto the spool means and for moving the supporting structure toward the predetermined position.

14. The mechanism according to claim 13 wherein the elongated strip is a flexible circuit means and the mounting surface and supporting structure are formed of insulating material, and further including conductive terminal means fixedly mounted on the mounting surface and on the supporting structure.

15. The mechanism according to claim 14 wherein the mounting surface is an inside surface of a communications console and wherein the supporting structure is adapted to be moved away from the predetermined position by the insertion of a communications unit into the console.

* * * * *